(No Model.)
W. A. WRIGHT.
CASTER.
No. 435,473. Patented Sept. 2, 1890.
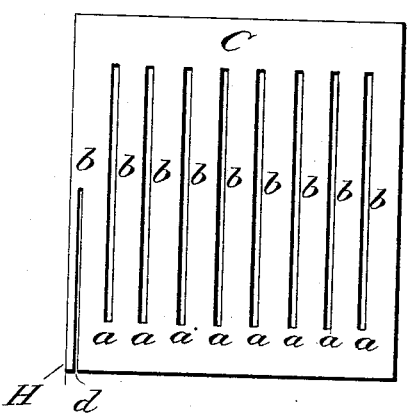
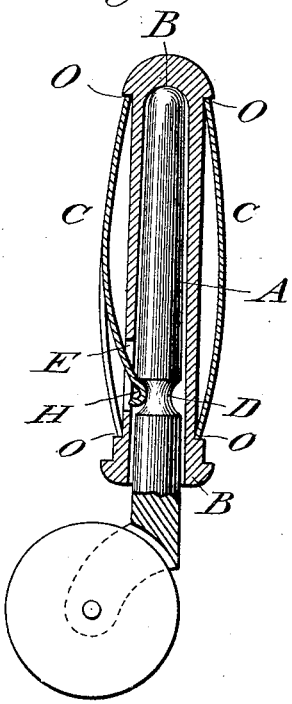
Witnesses:
Henry L. Winslow
Frank D. Read
Inventor:
William A. Wright
per George H. Allen
Attorney
THE NORRIS PETERS CO., PHOTO-LITHO., WASHINGTON, D. C.

UNITED STATES PATENT OFFICE.

WILLIAM A. WRIGHT, OF AYER, MASSACHUSETTS.

CASTER.

SPECIFICATION forming part of Letters Patent No. 435,473, dated September 2, 1890.

Application filed September 12, 1888. Serial No. 285,240. (No model.)

*To all whom it may concern:*

Be it known that I, WILLIAM A. WRIGHT, a citizen of the United States, residing at Ayer, in the county of Middlesex and State of Massachusetts, have invented a new and useful Caster for Furniture, of which the following is a specification.

My invention relates to improvements in casters, whereby the caster-socket is more easily placed in position than the ordinary forms of caster, and also whereby the caster is held in the socket and prevented from dropping out.

My invention consists in a caster-socket encircled by an outer shell or ferrule of sheet metal made in convex form and adapted to hold the caster-socket firmly in place, said shell or ferrule also being provided with an inwardly-extending point or finger passing through a small aperture in the caster-socket and adapted to lie in a circumferential groove in the shank of the caster to prevent the same from dropping out. I attain these objects by the device illustrated in the accompanying drawings, in which—

Figure 1 is a vertical half-section of a caster-shank, a caster-socket, and the inclosing convex sheet-metal shell or ferrule.

A is the shank of a caster provided with the circumferential groove D.

B is a caster-socket recessed at O nearly its entire length and having the small aperture E.

C is a sheet-metal shell or ferrule encircling the caster-socket B, and provided with the inwardly-extending point or finger H, which, passing through the aperture E, is adapted to lie in the circumferential groove D.

Fig. 2 represents the ferrule as stamped from the sheet metal, $a$ $a$ $a$ being slits extending nearly from end to end, leaving the strips $b$ $b$ $b$, which, when crimped in convex shape longitudinally, form springs which give to the ferrule when applied to the socket a yielding quality, adapting it to be pressed into the cavity provided for it in an article of furniture, and to be held firmly by its own spring. The ferrule, when adjusted to the caster-socket, fills the recess O O longitudinally, being sprung into the same, and is therefore in a state of tension. The point or finger H is formed by the slit $d$, and is adapted to be bent inwardly, as in Fig. 1. The caster and socket with the encircling ferrule, as shown in Fig. 1, being pressed into the cavity for the caster-socket in an article of furniture, the yielding ferrule C is pressed inwardly, and at the same time the point or finger H of the ferrule is pushed into the groove D of the caster-shank and held there, thus holding the caster in place.

Having described my invention, both as to construction and operation, what I claim, and desire to secure by Letters Patent, is—

1. In a caster, the yielding ferrule C, made with the slits $a$ $a$ convex in form encircling a caster-socket, combined with the recess O O of the said socket, within which it is sprung longitudinally, and adapted by its own spring or tension when applied to an article of furniture to hold the same in place, substantially as set forth.

2. In a caster, the yielding ferrule C, convex in form, sprung within the recess O O of a caster-socket provided with the point or finger H, extending through the aperture E of the caster-socket, in combination with the groove D of the caster-shank A, in which it is adapted to lie so that the caster is held in place, substantially as set forth.

WILLIAM A. WRIGHT.

Witnesses:
GEORGE S. GATES,
WILLIAM H. SHERMAN.